(12) United States Patent
Hartinger

(10) Patent No.: US 6,858,314 B2
(45) Date of Patent: Feb. 22, 2005

(54) BROMINATED POLYESTER RESINS, RESIN COMPOSITIONS CONTAINING BROMINATED POLYESTER RESINS, AND LAMINATE COMPOSITIONS

(75) Inventor: Danny George Hartinger, Franklin, OH (US)

(73) Assignee: Ashland, Inc., Ashland, KY (US)

( * ) Notice: Subject to any disclaimer, the term of this patent is extended or adjusted under 35 U.S.C. 154(b) by 58 days.

(21) Appl. No.: 10/274,982

(22) Filed: Oct. 22, 2002

(65) Prior Publication Data

US 2004/0077822 A1 Apr. 22, 2004

(51) Int. Cl.$^7$ .......................... B32B 27/10; C08G 79/02
(52) U.S. Cl. .................... 428/481; 528/295.5; 528/302; 528/303; 528/306; 528/307; 528/308; 525/438; 525/440; 525/445; 525/168; 524/81
(58) Field of Search .............................. 528/295.5, 302, 528/303, 306, 307, 308; 525/168, 438, 440, 445; 524/81; 428/481

(56) References Cited

U.S. PATENT DOCUMENTS

| | | |
|---|---|---|
| 3,829,532 A | 8/1974 | Meloy et al. |
| 4,175,072 A | * 11/1979 | Parr et al. .................... 528/299 |
| 4,184,035 A | 1/1980 | Goins |
| 4,264,745 A | 4/1981 | Foucht |
| 4,384,109 A | 5/1983 | Larsen et al. |
| 4,420,416 A | * 12/1983 | Larsen et al. ............... 502/168 |
| 4,569,986 A | 2/1986 | Oshima et al. |
| 4,902,773 A | 2/1990 | Bodnar et al. |

FOREIGN PATENT DOCUMENTS

| | | |
|---|---|---|
| CZ | 532689 | 1/1993 |
| EP | 0032189 | 7/1981 |
| GB | 2065685 | * 7/1981 |
| JP | 6151070 | 3/1986 |
| JP | 62207326 | 3/1986 |

OTHER PUBLICATIONS

D.P. Miller, "Neopentyl Bromide Based Flame Regardants for Unsaturated Polyester Resins and Other Applications" Daw Chemical USA, pp. 126–128.

Dennis P. Miller, et al., "Combining Dibromoneopentyl Gycol and Dicyclopentadiene to Optimize Flame Retardant Polyester Resin Properties" 35$^{th}$ Annual Technical Conference, 1980, Section 10–C, pp. 1–4.

* cited by examiner

Primary Examiner—Samuel A. Acquah
(74) Attorney, Agent, or Firm—Connolly Bove Lodge & Hutz LLP

(57) ABSTRACT

A brominated unsaturated polyester resin containing a hydroxyl value of about 35 or less and a hydroxyl acid molar ratio of about 2:1 to about 1:4. The brominated unsaturated polyester resin is prepared from a polyfunctional carboxylic acid, a monocarboxylic acid, and a polyfunctional glycol or alcohol that contains bromine under polyester esterification reaction conditions. The brominated unsaturated polyester resin can be incorporated into a resin composition that also contains vinyl monomer. The invention is also directed to a method of making a brominated unsaturated polyester resin, and to castings, coatings, and laminate panels containing cured brominated unsaturated polyester resin compositions of the invention.

57 Claims, No Drawings

BROMINATED POLYESTER RESINS, RESIN COMPOSITIONS CONTAINING BROMINATED POLYESTER RESINS, AND LAMINATE COMPOSITIONS

FIELD OF THE INVENTION

This invention is directed to unsaturated polyester resins containing bromine, and resin compositions containing the brominated resins. The invention is also directed to methods of making the unsaturated polyester resins containing bromine, and the use of such resins in castings, coatings, and laminate compositions.

BACKGROUND OF THE INVENTION

Fire retardant unsaturated polyester (UPE) resins with acceptable UV/weathering stability are prepared by reacting dibasic acids, e.g., maleic anhydride and phthalic anhydride, with brominated glycols or alcohols, e.g., dibromoneopentyl glycol (DBNPG), in combination with non-halogenated glycols or alcohols. The dibasic acids react with the glycols and alcohols in an esterification reaction process. However, during the esterification process a small amount of hydrogen bromide (HBr) is generated from the decomposition of the brominated glycols and alcohols, and results in the UPE resin having a dark orange color. Although the orange color is partially bleached out as the UPE resin is thinned, i.e., blended, in vinyl monomers, e.g., styrene, methyl methacrylate, etc. the HBr in the UPE resin reacts across the vinyl group of the vinyl monomer. The resulting brominated compounds, e.g., bromostyrene, are very unstable to heat and readily eliminate bromine during free-radical cure of the UPE resin. Also, bromine is released over time in the cured commercial product, especially if the product is exposed to sunlight and/or heat.

DBNPG is a commercially available fire retardant introduced by Dow Chemical that is used to make fire-retardant polyester resins. DBNPG is characterized by an aliphatic neopentyl structure and has no hydrogens atoms on carbon atoms adjacent to carbon atoms that contain bromine. As a result, DBNPG is relatively resistant to dehydrobromination at elevated temperatures, i.e., at esterification temperatures of about 160° C. to 210° C., compared to other halogenated glycols. DBNPG is also expected to be relatively stable to photodegradation for the same reason.

U.S. Pat. No. 4,420,416 describes that the addition of small quantities of an epoxide such as epichlorohydrin or the polyglycol diepoxide (D.E.R.®736) to UPE resin lightens the dark orange colored resin. However, this process generates new aliphatic bromine compounds that suffer from the same instability to heat and light as brominated vinyl monomers. As a result, the laminates made from the process exhibit extensive discoloration over an extended period of time.

UK Pat. No. 2,065,685 teaches the addition of at least one tri- or pentavalent compound of a Group V element, such as triphenyl antimony or triphenyl phosphite to the UPE polyester resin to improve color. However, UPE resins processed at conventional polyesterification temperatures with these compounds still provide a UPE resin with a dark orange color.

U.S. Pat. No. 4,175,072 teaches the inclusion of from 5 to 85 mole percent of tetrahydrophthalic acid or anhydride, or endomethylene tetrahydrophthalic acid or anhydride, into the UPE polyester resin for color improvement. However, UPE resins processed at conventional polyesterification temperatures with these compounds still provide a UPE resin with a dark orange color.

The discoloration over time of cured laminate compositions containing brominated UPE resins, e.g., construction panels and skylight fixtures, remains a problem for the industry. The use of DBNPG has helped to some extent, however for the reasons stated, current UPE resins made with DBNPG and other brominated glycols still experience significant discoloration over time. As a result, new UPE resins containing bromine are needed.

SUMMARY OF THE INVENTION

The invention is directed to a brominated UPE resin containing a hydroxyl value of about 35 or less and a hydroxyl:acid molar ratio of about 2:1 to about 1:4. The UPE resin is prepared from one or more polyfunctional carboxylic acids, at least one of which contains $\alpha,\beta$-unsaturation, one or more monocarboxylic acids, and one or more alcohols or polyfunctional glycols, at least one of which contains bromine, under polyester esterification reaction conditions.

The invention is also directed to a resin composition containing a brominated UPE resin with a hydroxyl value of about 35 or less and a hydroxyl:acid molar ratio of about 2:1 to about 1:4, and one or more vinyl monomers. The UPE resin is present in an amount from 30% to 90% by weight of the resin composition.

The invention is also directed to a method of making brominated UPE resins. The method includes: providing one or more polyfunctional carboxylic acids, at least one of which contains $\alpha,\beta$-unsaturation, providing one or more monocarboxylic acids; providing one or more alcohols or polyfunctional glycols, at least one of which contains bromine; combining the one or more polyfunctional carboxylic acids, the one or more monocarboxylic acids, and the one or more alcohols or polyfunctional glycols in an esterification vessel to form a polyester reaction mixture; and providing a reaction time under polyester reaction conditions to form the UPE resin with a hydroxyl value of about 35 or less and a hydroxyl:acid molar ratio of about 2:1 to about 1:4.

The invention is also directed to a method of making UPE resin compositions. The method includes: providing a brominated UPE resin with a hydroxyl value of about 35 or less and a hydroxyl:acid molar ratio of about 2:1 to about 1:4; and combining the brominated UPE resin with one or more vinyl monomers. The UPE resin accounts for 30% to 90% by weight of the resin composition.

The resin compositions of the invention can then be combined with one or more blending resins. The polyester resin composition with the blending resin includes adding sufficient polyester resin to account for 1% to 90% by weight of the resin composition.

The invention is also directed to cured castings, coatings, and laminate compositions containing a brominated UPE resin with improved UV and weathering resistance, i.e. improved resistance to laminate discoloration over time.

DETAILED DESCRIPTION OF THE INVENTION

This invention is directed to UPE resins containing bromine and resin compositions containing the brominated UPE resin with one or more vinyl monomers. These resin compositions can also include one or more blending resins. The brominated UPE resins of the invention have a hydroxyl value of about 35 or less and a hydroxyl:acid molar ratio of about 2:1 to about 1:4. Hydroxyl and acid values are calculated on a 100% solid sample basis (see, Examples 6 and 7).

The hydroxyl value is a common term used in the art to characterize the UPE resin during and after completion of the esterification reaction process. The hydroxyl value corresponds to the number of —OH groups that remain in the prepared UPE resin. The hydroxyl value can also be used to monitor the extent of the esterification reaction process. For a given process, longer reaction times will correspond to lower hydroxyl values. Another factor in determining the final hydroxyl value of the UPE resin is the molar ratio of glycol and alcohol to acid used in the esterification reaction. Typically, a relatively higher molar ratio of glycol and alcohol to acid will provide an UPE resin with a higher hydroxyl value.

An alternative way of characterizing an UPE resin is by acid value. As the case with hydroxyl value, the acid value is a common term used in the art to characterize the UPE resin during and after completion of the esterification reaction process. The acid value corresponds to the number of —COOH groups that remain in the prepared UPE resin. The acid value is also used to monitor the extent of the esterification reaction process. In fact, monitoring the esterification process using acid values is typically preferred over hydroxyl values because a simple titration of a reaction aliquot is all that is required. Again, for a given process, longer reaction times will correspond to lower acid values. Another factor in determining a final acid value is the relative molar ratio of glycol and alcohol to acid used in the esterification reaction. Typically, a relatively low molar ratio of glycol and alcohol to acid will provide an UPE resin with a higher acid value.

After inquiries from commercial vendors regarding the discoloration problem associated with using brominated UPE resins to make various commercial products, Applicant has identified a relationship between the hydroxyl value in the prepared UPE resins and the degree of discoloration observed in products after accelerated environmental stressing. Laminate products manufactured with resin compositions containing brominated UPE resins of the invention with hydroxyl values of about 35 or less, exhibit an increase in heat stability and/or an increase in stability to sunlight.

As a result of the identified relationship, Applicant can design a particular brominated UPE resin for a given commercial product depending on whether the product will be exposed to relatively high temperatures, relatively high amounts of direct sunlight or other sources of UV radiation, or both.

The hydroxyl value of the brominated UPE resins of the invention will be about 35 or less. If greater stability towards discoloration is desired a hydroxyl value of about 25 or less is preferred, more preferably a hydroxyl value of about 15 or less.

The hydroxyl:acid molar ratio of the brominated UPE resins of the invention is about 2:1 to about 1:4, preferably about 1:1 to about 1:4, more preferably about 1:1 to 1:3.

One way Applicant controls the hydroxyl value of the brominated UPE resins of the invention is by the addition of aliphatic or aromatic monocarboxylic acids to the esterification reaction mixture. The molar ratio of monocarboxylic acid to polyfunctional carboxylic acid added to the esterification reaction mixture is about 1:1 to about 1:5, preferably about 1:2 to about 1:3. The advantage of adding monocarboxylic acids over adding alcohols to the reaction mixture to control end-groups is that the bromine concentration in the UPE resin is not as significantly reduced. As a result, the brominated UPE resins of the invention can be produced with relatively high bromine concentrations (% by weight).

Examples of some monocarboxylic acids that can be used include benzoic acid, 2-ethylhexanoic acid, caprylic acid, lauric acid, "Neo Acids" and the like. It is to be understood, that the provided list is only a sampling of the many commercially available monocarboxylic acids that can be used, and does not limit the invention to those recited. Saturated monocarboxylic acids are preferred over aromatic monocarboxylic acids for improved UV stability.

Many commercially available unsaturated polyfunctional carboxylic acids can be used to make the brominated UPE resins of the invention. The unsaturated acid provides the unsaturation point needed for subsequent reaction or cross-linking with the vinyl monomer(s) to form a cured resin composite. The term polyfunctional carboxylic acid, as used herein, includes the corresponding acid anhydride. Examples of some diacids that can be used include maleic, fumaric, and itaconic. It is to be understood, that the provided list is only a sampling of the many commercially available, unsaturated polyfunctional carboxylic acids that can be used, and does not limit the invention to those recited.

Saturated and/or aromatic polyfunctional carboxylic acids can also be used to make the brominated UPE resins of the invention. The ratio of unsaturated polyfunctional carboxylic acid to saturated/aromatic polyfunctional carboxylic acid is dictated by the degree of crosslinking desired in the cured product.

Examples of some saturated polyfunctional carboxylic acids that can be used include common aliphatic dicarboxylic acids such as adipic acid, succinic acid, cyclohexanedicarboxylic acid, hexahydrophthalic anhydride, and tetrahydrophthalic anhydride. Common aromatic dicarboxylic acids such as phthalic anhydride, isophthalic acid, and terephthalic acid can also be used. It is to be understood, that the provided list is only a sampling of the many commercially available, saturated and aromatic polyfunctional carboxylic acids that can be used, and does not limit the invention to those recited.

Any brominated alcohol and glycol can be used to make the brominated UPE resins of the invention. Examples of brominated alcohols and glycols include DBNPG, tribromoneopentyl alcohol, as well as other commonly used brominated alcohols and glycols known in the art. In the preferred UPE resins of the invention, DBNPG is the brominated glycol of choice. The amount of brominated glycol added to the reaction mixture is sufficient to provide an UPE resin with a bromine content of 1% to 50%, more typically 10% to 30% by weight, and is determined by the degree of fire-retardance desired in the cured part.

Non-halogenated, e.g., non-brominated, polyfunctional glycols or alcohols can be used in combination with the brominated glycols or alcohols to make the brominated UPE resins of the invention. Again, the ratio of brominated glycols or alcohols to non-halogenated polyfunctional glycols or alcohols used in the preparation depends upon the desired bromine concentration in the final product.

Examples of some non-halogenated polyfunctional glycols and alcohols that can be used in the preparation of the brominated UPE resins of the invention include trimethylol propane, pentaerythritol, glycerine, neopentyl glycol, propylene glycol, ethylene glycol, butylethylpropanediol, hexanediol, cyclohexanedimethylol, methanol, ethanol, propanol, butanol, benzyl alcohol, and 2-ethylhexanol. It is to be understood, that the provided list is only a sampling of the many commercially available, non-halogenated polyfunctional glycols and alcohols that can be used, and does not limit the invention to those recited.

The UPE resins of the invention are prepared in suitable esterification reaction vessels equipped with a means for removing water formed in the reaction. The reactants are blanketed and/or sparged with an inert atmosphere, preferably nitrogen gas, agitated and heated for a desired period of time. The reaction temperature typically ranges from 100° to 230° C., preferably from 135° to 170° C. The reaction time required depends in-part on the resin formulation, the reaction temperature, any esterification catalysts used, and the inert gas sparge rate.

The esterification reaction is conveniently monitored by measuring the acid value, hydroxyl value and/or resin viscosity over time. Conventionally, the reaction is discontinued when the product has reached the desired acid value (e.g., an acid value of 40 or below) and the desired viscosity.

The prepared resin is then blended with one or more vinyl monomers to form UPE resin compositions of the invention. The vinyl monomers can later copolymerize with the unsaturated polyfunctional carboxylic acids of the brominated UPE resin, providing a three-dimensional cross-linked matrix of polyester/polymonomer chains.

Any one or more vinyl monomers can be used to form a resin composition of the invention. Examples of some vinyl monomers that can be used include styrene, methyl methacrylate, vinyl toluene, divinylbenzene, dicyclopentadiene alkeonates, (meth)acrylic acid or their alcohol/glycol esters, dialkyl phthalates and mixtures thereof. The preferred vinyl monomers used are styrene, methyl methacrylate, and a mixture of styrene and methyl methacrylate. It is to be understood, that the provided list is only a sampling of the many commercially available vinyl monomers that can be used, and does not limit the invention to those recited.

The resin compositions of the invention contain 30% to 90% by weight, preferably 50% to 70% by weight of the brominated UPE resin. The bromine in the UPE resin composition typically accounts for 1% to 50%, typically 10% to 30%, by weight of the resin composition, and is dependent on the fire resistance desired in the cured part.

A small amount of an inhibitor such as hydroquinone, toluhydroquinone, mono-tertiary butyl hydroquinone, tertiary butyl catechol or the like, can also be added to the resin compositions. The inhibitors are used to minimize the degree of copolymerization during processing of the brominated UPE resin, subsequent storage, and shipment.

The polyester resins of the invention can also be blended with one or more blending resins. The blending resins can be selected from halogenated or non-halogenated, saturated or unsaturated polyester resins, epoxy vinyl ester resins, and saturated or unsaturated polyurethane resins to make castings, coatings, and laminates.

The invention is also directed to methods of making the UPE resins containing bromine, and the use of such resins in other resin compositions. The method of making a brominated UPE resin of the invention includes: providing one or more polyfunctional carboxylic acids, at least one of the polyfunctional carboxylic acids containing $\alpha,\beta$-unsaturation; providing one or more monocarboxylic acids; providing one or more alcohols or polyfunctional glycols, at least one of which contains bromine; combining the one or more polyfunctional carboxylic acids, the one or more monocarboxylic acids, and the one or more alcohols or polyfunctional glycols in an esterification vessel to form an UPE reaction mixture; and providing a reaction time under polyester reaction conditions to form the brominated UPE resin with a hydroxyl value of about 35 or less and a hydroxyl:acid molar ratio from about 2:1 to about 1:4. In the preferred embodiment, the glycol containing bromine is dibromoneopentyl glycol.

In one embodiment, the method of the invention includes providing a sufficient reaction time to obtain a brominated UPE resin with a hydroxyl value of about 25 or less.

In another embodiment, the method of the invention includes providing a sufficient reaction time to obtain a polyester resin with a hydroxyl value of about 16 or less.

The invention is also directed to a method of making a brominated UPE resin composition. The method includes providing a brominated UPE resin with a hydroxyl value of 35 or less and a hydroxyl:acid molar ratio of 2:1 to 1:4, wherein the UPE resin contains bromine, and combining the brominated UPE resin with a vinyl monomer. The brominated UPE resin accounts for 30% to 90% by weight, preferably 50% to 70% by weight, of the resin composition. The resin compositions of the invention are crosslinkable and can be used in the manufacture of laminates, castings or coatings.

The resin compositions of the invention can also be blended with other halogenated or non-halogenated, saturated or unsaturated polyester resins, epoxy vinyl ester resins, and saturated or unsaturated polyurethane resins. The brominated UPE resin accounts for 1% to 90% by weight, preferably 30% to 70% by weight, of the resin composition. The blended resin compositions can also be used to make castings, coatings, and laminates.

Castings, coatings, and laminates can be made by mixing into the crosslinkable composition: fillers, free radical forming initiators, polymerization accelerators, plasticizers, antioxidants, UV stablizers, fire-retardant enhancers, e.g., dimethylmethylphosphonate and antimony compounds, dyes, pigments, fungicides, insecticides, antistatic agents, wetting agents, inhibitors, viscosity modifiers and other materials well known to those skilled in the art. For making laminates, a suitable fibrous reinforcement such as carbon fibers, fibrous glass or inorganic fibers is also added to this mixture.

Typical fillers include calcium carbonate, aluminum trihydrate, titanium dioxide, and the like. Examples of free radical initiators are benzoyl peroxide, tertiary butyl peroxide, methylethyl ketone peroxide and the like. Examples of accelerators are cobalt naphthenate, dimethyl aniline and the like.

The resin composition is rolled, sprayed or impregnated into a fibrous reinforcement such as fibrous glass or is used in filled compositions and cured in a manner well known in the art. When fibrous glass is used, it can be in any form such as chopped strands, filaments, glass ribbons, glass yarns or reinforcing mats. The laminates can be used in construction panels, e.g., as transparent media for skylight fixtures.

The invention and its benefits will be better understood with reference to the following examples. These examples are intended to illustrate specific embodiments within the overall scope of the invention as claimed, and are not to be understood as limiting the invention in any way.

COMPARATIVE EXAMPLE 1

The esterification reactions were carried out in a 3-liter, glass resin flask equipped with a glass agitator shaft fitted with a Teflon® mixing blade, a glass sparge tube, two glass mercury thermometers (one to monitor the overhead distillate temperature and the other to control the reactor temperature in conjunction with a Thermowatch® temperature controller and an electric heating mantle, and a water cooled condenser to collect the distillate.

The reaction vessel is charged with 584 grams (5.96 moles) of maleic anhydride (MAN), 242 grams (1.59 moles) of tetrahydrophthalic anhydride, and 352 grams (2.38 moles) of phthalic anhydride. The reactor is sparged with nitrogen to remove air from the system and heated to 121° C., followed by the addition of 3,000 grams (11.45 moles) of DBNPG. The reaction mixture is heated to 166° C. and esterified to an acid value of 28.9 (solids basis), a hydroxyl value of 81.2 (solids basis) and a viscosity of 30 stokes (plastic thinned in inhibited styrene at a 75/25 ratio: plastic/styrene).

The prepared UPE resin is poured into a 1.5 gallon stainless steel thin tank, equipped with cooling coils, which contained 1,368 grams of styrene, 0.4 grams of mono-tertiary butyl hydroquinone, and 13.4 grams of D.E.R.®736 epoxy. The resin composition is cooled to room temperature. This resin composition is used as a control. The control resin composition has a viscosity of 4,310 cps at 73.4% non-volatiles and an APHA color of about 150. NOTE: The plastic was dark orange in color before adding to the thin tank.

EXAMPLE 1

The apparatus and process as described in Comparative Example 1 is used. 693.2 grams (7.07 moles) of MAN, 324.4 grams (1.89 moles) of cyclohexanedicarboxylic acid, 509.6 grams (3.54 moles) 2-ethylhexanoic acid, and 2,717.2 grams (10.37 moles) of DBNPG are added to the reaction vessel as described in Comparative Example 1. The reaction mixture is esterified to an acid value of 17.4, a hydroxyl value of 23.9, and a viscosity of 27.4 stokes. The orange color generated in early stages, dissipates near the end of the of the esterification reaction, and is absent by the time the UPE resin is ready to be thinned in styrene. There can be a slight yellowish hue to the UPE resin, but not the orange color typically observed with known preparations of brominated UPE resins.

The prepared UPE resin is poured into a 1.5 gallon stainless steel thin tank, equipped with cooling coils, which contained 1,368 grams of styrene, 0.4 grams of mono-tertiary butyl hydroquinone, and 13.4 grams of D.E.R.®736 epoxy. The resin composition is cooled to room temperature. The resin composition had a viscosity of 4,430 cps at 71.1% non-volatiles and had an APHA color of about 150.

EXAMPLE 2

The apparatus and process as described in Comparative Example 1 is used. 886.5 grams (9.05 moles) of MAN, 558.2 grams (3.88 moles) 2-ethylhexonic acid, and 2,539.0 grams (9.69 moles) of DBNPG are added to the reaction vessel. The reaction mixture is esterfifed to an acid value of 29.6 and a hydroxyl value of 12.1. Again, during the later part of the polyesterification reaction, the orange color dissipates and is absent by the time the UPE resin is ready to be thinned in styrene.

The prepared polyester resin is poured into a 1.5 gallon stainless steel thin tank, equipped with cooling coils, which contained 1,368 grams of styrene, 0.4 grams of mono-tertiary butyl hydroquinone, and 13.4 grams of D.E.R.®736 epoxy. The resin composition is cooled to room temperature. The resin composition has a viscosity of 4,680 cps 71.9% non-volatiles and an APHA color of about 150.

EXAMPLE 3

The apparatus and process as described in Comparative Example b 1is used. 886.5 grams (9.05 moles) of MAN, 558.2 grams (3.88 moles) caprylic acid, and 2,539.0 grams (9.69 moles) of DBNPG are added to the reaction vessel. The reaction mixture is esterified to an acid value of 23.9, hydroxyl value of 8.7, and a viscosity of 20.4 stokes. Again, during the later part of the polyesterification reaction, the orange color dissipates and is absent by the time the UPE resin is ready to be thinned in styrene.

The prepared UPE resin is poured into a 1.5 gallon stainless steel thin tank, equipped with cooling coils, which contained 1,368 grams of styrene, 0.4 grams of mono-tertiary butyl hydroquinone, and 13.4 grams of D.E.R.®736 epoxy. The resin composition is cooled to room temperature. The resin composition has a viscosity of 2,932 cps at 72.6% non-volatiles and an APHA color of about 90.

EXAMPLE 4

The apparatus and process as described in Comparative Example 1 is used. 838.7 grams (8.56 moles) of MAN, 733.4 grams (3.67 moles) lauric acid, and 2,402.0 grams (9.16 moles) of DBNPG are added to the reaction vessel. The reaction mixture is esterified to an acid value of 26.5, hydroxyl value of 9.9, and a viscosity of 18.6 stokes. Again, during the later part of the polyesterification reaction, the orange color dissipates and is absent by the time the UPE resin is ready to be thinned in styrene.

The prepared UPE resin is poured into a 1.5 gallon stainless steel thin tank, equipped with cooling coils, which contained 1,368 grams of styrene, 0.4 grams of mono-tertiary butyl hydroquinone, and 13.4 grams of D.E.R.®736 epoxy. The resin composition is cooled to room temperature. The resin composition had a viscosity of 12,840 cps to 73.5% non-volatiles. NOTE: The styrenated resin started to crystallize which accounted for the abnormally high viscosity and prevented a color reading.

EXAMPLE 5

The resins from Comparative Example 1 and Examples 2, 3 and 4 are each blended with additional styrene to provide resin compositions with 28.0% by weight bromine. The three bromine adjusted resin compositions are blended with an isophthalic resin (AROPOL™ 2036B Resin) and additional styrene at a ratio of 73/23/4 respectively, to obtain resin compositions with 20.4% by weight bromine. Each of these resins is formulated into a "panel-resin" formulation by adding equal amounts of white pigment, UV stabilizer, accelerator, and free-radical initiator (catalyst).

Single ply laminates (using C-veil) are made from these resin compositions with equal glass content. The laminates are cut into 3"×6" coupons, and tested in two environments for 44 days. Environment #1 was an oven at 66° C., and environment #2 was an accelerated weather-o-meter test, cycling through 4hours exposure to UV-A at 65° C., followed by 4 hours of 100% relative humidity at 65° C. The results of these exposures are provided below in Table 1. The resins of Examples 2, 3 and 4 show significantly greater resistance to color change than the control resin (Comparative Example 1).

TABLE 1

| Sample | 49 days at 66° C. ΔYI | 49 days at 66° C. ΔE | Weather-o-meter 49 days ΔYI | Weather-o-meter 49 days ΔE |
| --- | --- | --- | --- | --- |
| Comp. Ex. 1 | 10.95 | 7.37 | 77.97 | 47.49 |
| Ex. 2 | 6.09 | 4.28 | 62.82 | 39.48 |
| Ex. 3 | 5.82 | 3.81 | 59.99 | 37.20 |
| Ex. 4 | 6.12 | 3.91 | 50.53 | 31.35 |

EXAMPLE 6

Evaluation of Acid Value

The acid value is the number of milligrams of potassium hydroxide (KOH) required to neutralize the alkali-reactive groups in 1 gram of polyester resin following the procedure provided below. If acid anhydrides are present, only one of the two acid groups will be titrated and indicated by this method.

Acid value is determined by titrating a known weight of polyester resin dissolved in organic solvent(s) with a standardized solution of KOH. The solution can be titrated using a chemical indicator such as phenolphthalein solution or using a conductance meter such as an auto-titrator. If phenolphthalein is used, the KOH is added until a slight pink color is observed. If an auto-titrator is used, the KOH is added until no change in conductance is observed upon further addition of KOH. This point is called the equivalence point. The volume KOH used to reach this point is used to calculate the acid number of the resin.

Types of auto-titrator that can be used include a Brinkmann 702, 716, 736, or any equivalent. The electrode system includes a Massive Platinum Rod Electrode (Brinkman (#20-02-819-1) or equivalent; AgCl Reference Electrode: Brinkman (# 20-94-405-6) or equivalent; and a Standard Glass Electrode Brinkman (# 20-91-095-0) or equivalent.

Procedure A

Weigh about 5 g of polyester resin to the nearest 0.01 g into a 125 ml or 250 ml flask. Add a solvent mixture containing equal volumes of toluene, isopropyl alcohol and acetone to the resin and mix until all the resin is dissolved. The solvent is previously neutralized using 0.1 N KOH solution and about 1 mL of phenolphthalein solution for every 100 mL of the solvent mixture. If sample does not dissolve readily, stopper the flask and shake with a vertical motion until the product is completely dissolved or stir on a magnetic stirrer. Warm if necessary, but cool the solution to room temperature before titrating. Add about 1 ml of phenolphthalein indicator solution (about 1 g phenolphthalein in 100 mL methanol) to the solution 0.1N KOH is then quickly added to the solution. The procedure is best carried out by adding the bulk of the titrant as rapidly as possible. As the end point is approached, add about four drops of titrant at a time, and finally 2 drops at a time until light pink color persists for 10 seconds or longer. Read the buret to the nearest 0.1 ml and record the end point. The entire titration should be completed within 30 seconds, if possible.

Procedure B

Weigh about 5 g of polyester resin (sample) to the nearest 0.01 g into a 125 ml or 250 ml flask. Add 25 mL to 50 mL of acetone to the resin and mix until all the resin is dissolved. If sample does not dissolve readily, stopper the flask and shake with a vertical motion until the product is completely dissolved or stir on a magnetic stirrer. Warm if necessary, but cool the solution to room temperature before titrating. Add a stir bar in the solution and place the auto-titrator electrodes into the solution. Titrate the solution by adding the KOH solution.

Calculations

1.

$$\text{Acid Value (as is)} = \frac{V \times N \times 56.1}{W}$$

or $$\frac{V \times 5.61}{W}$$

if normality is exactly 0.1N.

Where:
V=ml of alcohol KOH solution required for titration
N=normality of alcohol KOH solution
W=grams of sample used

2.

$$\text{Acid Value (Solid Basis)} = \frac{\text{Acid Value (as is)} \times 100}{\% \text{ Solids in Sample}}$$

EXAMPLE 7

Evaluation of Hydroxyl Value

The hydroxyl value is defined as the number of mg of KOH equivalent to the hydroxyl content of 1 gram of sample. It is normally calculated on the solids basis and corrected for acid value and/or alkalinity value. The polyester resin (sample) is acetylated with a solution of acetic anhydride in pyridine. The excess acetic anhydride is hydrolyzed with water, and the resulting acetic acid is titrated with standardized KOH solution. The hydroxyl content is calculated from the difference in titration of blank and sample solutions.

Freshly prepare a solution by mixing 100 ml of pyridine (3.5 ml of distilled water to each 1000 mL) and 10 ml of acetic anhydride. Weigh about 10 g to 20 g of polyester resin (sample) to the nearest 0.01 g into a 100 mL flask. As soon as the weighing has been completed, stopper the flask with a dry stopper to prevent contamination of the sample.

Pipet exactly 25 ml of the pyridine-acetic anhydride reagent into one, two or three empty flasks for the reagent blanks. Add 10 ml of distilled water to the blanks. Using silicone grease, seal the blank flasks with glass stoppers and mix thoroughly. The blanks must sit for a minimum of 30 minutes after water is added.

Pipet exactly 25 ml of the pyridine-acetic anhydride reagent into the flask containing the sample for acetylation and attach a greased air or water condenser to the flask, thoroughly mix the contents by gently swirling. Heat the flasks with attached condensers on a hot plate at 200±10° F. for 20 to 22 minutes, swirling occasionally. Remove from the hot plate, cool for 2 minutes minimum, and then add 10±2 ml of distilled water down the condensers. Place back on the hot plate, swirling several times. Remove at the first sign of boiling, and in no case, allow the condensate to climb more than $\frac{1}{3}$ up the condenser. Cool to room temperature.

Add 25 ml of pyridine to each sample and blank. Use about half of the pyridine to rinse down the condenser, and use the remainder to rinse the end of the condenser and the neck of the flask. Stopper all flasks with glass stoppers until ready to titrate.

Wash down the stopper and neck of the flask with a small amount of water from a wash bottle. Add about 1 ml of phenolphthalein indicator solution, and titrate to a faint pink endpoint with 0.1 N alcoholic KOH solution. As the endpoint is approached, wash down the sides of the flask again with a small amount of water from the wash bottle. Stopper and shake vigorously if sludge is present as the sludge will tend to trap acetic acid. The pink endpoint must persist for 15 seconds. Read the buret to the nearest 0.1 mL, and if possible, 2 or 3 minutes after beginning the titration. Use a timing device to measure titration time. Time for sample and blanks must be the same. Blank titrations must check within 0.1 mL.

Note: If the volume of the 1.0 N KOH solution required for the sample is less than 80% of that required for the blank, the sample was too large and the analysis should be repeated with a smaller weight of sample.

Calculations

1.

$$\text{Hydroxyl Value, Corrected} = \left[\frac{(B-A) \times N \times 56.1}{W} \times \frac{100}{S}\right] + [C] \text{ or } - [D]$$

Where:
A=mL of KOH required for titration of the sample
B=mL of KOH required for titration of the blank
N=normality of the KOH
S=% solids of sample
W=grams of sample used
C=acid value of sample (on solids basis)
D=alkalinity value of sample (on solids basis)

If a sample contains significant acidity or alkalinity, the result may be corrected as follows:

a. Acidity correction. The acid value determined by the normally applicable test method may be used.
b. Alkalinity correction. If the solution in a titrated sample remains pink, titrate to the disappearance of the pink color with 0.1N HCl, then add 1.0 ml in excess. Back titrate with standard 0.1N KOH solution to a pink end point that persists for at least 15 seconds. Titrate with standard 0.1N KOH solution a blank containing exactly the same amount of added 0.1N HCl and the reagent mixture omitting the sample. The alkalinity correction in milligrams of KOH per gram is calculated as follows:

$$\text{Alkalinity Value} = \frac{(B-A)N \times 56.1}{W} \times \frac{100}{S}$$

$$\% \text{ Hydroxyl} = \frac{\text{Hydroxyl Value Corrected}}{32.98}$$

What is claimed:

1. A polyester resin comprising a hydroxyl value of about 35 or less and a hydroxyl:acid molar ratio of about 2:1 to about 1:4, wherein the polyester resin contains bromine.

2. The polyester resin of claim 1 wherein the hydroxyl value is about 25 or less.

3. The polyester resin of claim 1 wherein the hydroxyl value is about 15 or less.

4. The polyester resin of claim 1 wherein the hydroxyl:acid molar ratio is about 1:1 to about 1:3.

5. The polyester resin of claim 1 wherein the polyester resin is prepared from one or more polyfunctional carboxylic acids, at least one polyfunctional carboxylic acid with α,β-unsaturation, one or more monocarboxylic acids, and one or more alcohols or polyfunctional glycols, at least one of which contains bromine, under polyester esterification reaction conditions.

6. The polyester resin of claim 5 wherein the one or more polyfunctional glycols containing bromine includes dibromoneopentyl glycol.

7. The polyester resin of claim 5 wherein the monocarboxylic acids and polyfunctional carboxylic acids are provided in a molar ratio of about 1:5 to about 1.1, respectively.

8. A resin composition comprising:
a polyester resin with a hydroxyl value of about 35 or less and a hydroxyl:acid molar ratio of about 2:1 to about 1:4, wherein the polyester resin contains bromine, and vinyl monomer.

9. The resin composition of claim 8 wherein the polyester resin is present in an amount from 30% to 90% by weight of the resin composition.

10. The resin composition of claim 8 wherein the polyester resin is present in an amount from 50% to 70% by weight of the resin composition.

11. The resin composition of claim 8 wherein the vinyl monomer is selected from the group consisting of styrene, methyl methacrylate, vinyl toluene, divinylbenzene, dicyclopentadiene alkeonates, (meth)acrylic acid, alcohol or glycol esters of (meth)acrylic acid, and dialkyl phthalate.

12. The resin composition of claim 8 wherein the vinyl monomer comprises styrene and methyl methacrylate.

13. The resin composition of claim 8 wherein the bromine in the polyester resin accounts for 1% to 50% by weight of the resin composition.

14. The resin composition of claim 8 wherein the bromine in the polyester resin accounts for 10% to 30% by weight of the resin composition.

15. The resin composition of claim 8 wherein the polyester resin is prepared from one or more polyfunctional carboxylic acids, at least one polyfunctional carboxylic acid with α,β-unsaturation, and one or more monocarboxylic acids, and the monocarboxylic acids and polyfunctional carboxylic acids are provided in a molar ratio of about 1:5 to about 1:1, respectively.

16. A resin composition comprising:
a polyester resin with a hydroxyl value of about 35 or less and a hydroxyl:acid molar ratio of about 2:1 to about 1:4, wherein the polyester resin contains bromine;
vinyl monomer; and
a blending resin.

17. The resin composition of claim 16 wherein the brominated polyester resin is present in an amount from 1% to 90% by weight of the resin composition.

18. The resin composition of claim 16 wherein the brominated polyester resin is present in an amount from 30% to 70% by weight of the resin composition.

19. The resin composition of claim 16 wherein the vinyl monomer is selected from the group consisting of styrene, methyl methacrylate, vinyl toluene, divinylbenzene, dicyclopentadiene alkeonates, (meth)acrylic acid, alcohol or glycol esters of (meth)acrylic acid, and dialkyl phthalate.

20. The resin composition of claim 16 wherein the bromine in the polyester resin accounts for 1% to 50% by weight of the resin composition.

21. The resin composition of claim 16 wherein the bromine in the polyester resin accounts for 10% to 30% by weight of the resin composition.

22. The resin composition of claim 16 wherein the blending resin is selected from the group consisting of saturated or unsaturated polyester resin, epoxy vinyl ester resin, and saturated or unsaturated polyurethane resin.

23. The resin composition of claim 16 wherein the brominated polyester resin is prepared from one or more polyfunctional carboxylic acids, at least one polyfunctional carboxylic acid with α,β-unsaturation, and one or more monocarboxylic acids, and the monocarboxylic acids and polyfunctional carboxylic acids are provided in a molar ratio of about 1:5 to about 1:1, respectively.

24. A method of making a polyester resin containing bromine comprising:

providing one or more polyfunctional carboxylic acids, at least one polyfunctional carboxylic acid with α,β-unsaturation;

providing one or more monocarboxylic acids;

providing one or more polyfunctional glycols or alcohols, at least one of which contains bromine;

combining the one or more polyfunctional carboxylic acids, the one or more monocarboxylic acids, and the one or more polyfunctional glycols or alcohols in an esterification vessel to form a polyester reaction mixture; and providing a reaction time under polyester reaction conditions to form the polyester resin with a hydroxyl value of about 35 or less and a hydroxyl:acid molar ratio from about 2:1 to about 1:4.

25. The method of claim 24 wherein the one or more polyfunctional glycols containing bromine includes dibromoneopentyl glycol.

26. The method of claim 24 further comprising combining non-halogenated polyfunctional glycols in the polyester reaction mixture.

27. The method of claim 26, wherein the non-halogenated polyfunctional glycols are selected from the group consisting of neopentyl glycol, butylethylpropanediol, hexanediol, and cyclohexanedimethylol.

28. The method of claim 24 further comprising combining non-halogenated alcohols in the polyester reaction mixture.

29. The method of claim 28 wherein the non-halogenated alcohol is selected from the group consisting of methanol, ethanol, propanol, butanol, benzyl alcohol, and 2-ethylhexanol.

30. The method of claim 24 wherein the monocarboxylic acids and the polyfunctional carboxylic acids are provided in a molar ratio of about 1:5 to about 1:1, respectively.

31. The method of claim 24 wherein providing the reaction time is sufficient to obtain a polyester resin with a hydroxyl value of about 25 or less.

32. The method of claim 24 wherein providing the reaction time is sufficient to obtain a polyester resin with a hydroxyl value of about 15 or less.

33. The method of claim 24 wherein the polyester resin has a hydroxyl:acid molar ratio from about 1:1 to about 1:3.

34. A method of making a polyester resin composition comprising:

providing a polyester resin with a hydroxyl value of about 35 or less and a hydroxyl:acid molar ratio of about 2:1 to about 1:4, wherein the polyester resin contains bromine, and combining the polyester resin with a vinyl monomer.

35. The method of claim 34 wherein combining the polyester resin with the vinyl monomer includes adding sufficient polyester resin to account for 30% to 90% by weight of the resin composition.

36. The method of claim 34 wherein combining the polyester resin with the vinyl monomer includes adding sufficient polyester resin to account for 50% to 70% by weight bromine of the resin composition.

37. The method of claim 34 wherein providing the polyester resin includes a polyester resin with a hydroxyl value of about 25 or less.

38. The method of claim 34 wherein providing the polyester resin includes a polyester resin with a hydroxyl value of about 15 or less.

39. The method of claim 34 wherein providing the polyester resin includes a polyester resin with a hydroxyl:acid molar ratio of about 1:1 to about 1:3.

40. The method of claim 34 wherein the bromine in the polyester resin accounts for about 1% to about 50% by weight of the resin composition.

41. The method of claim 34 wherein the vinyl monomer comprises styrene and methyl methacrylate.

42. A method of making a polyester resin composition comprising:

providing a polyester resin with a hydroxyl value of about 35 or less and a hydroxyl:acid molar ratio of about 2:1 to about 1:4, wherein the polyester resin contains bromine, and combining the polyester resin with vinyl monomer and a blending resin.

43. The method of claim 42 wherein combining the polyester resin composition with the blending resin includes adding sufficient polyester resin to account for 1% to 90% by weight of the resin composition.

44. The method of claim 42 wherein combining the polyester resin composition with the blending resin includes adding sufficient polyester resin to account for 30% to 70% by weight of the resin composition.

45. The method of claim 42 wherein providing the polyester resin includes a polyester resin with a hydroxyl value of about 25 or less.

46. The method of claim 42 wherein providing the polyester resin includes a polyester resin with a hydroxyl value of about 15 or less.

47. The method of claim 42 wherein providing the polyester resin includes a polyester resin with a hydroxyl:acid molar ratio of about 1:1 to about 1:3.

48. The method of claim 42 wherein the bromine in the polyester resin accounts for about 1% to about 50% by weight of the resin composition.

49. A casting, coating, or laminate panel containing a crosslinked polyester resin, wherein the cross-linked resin is obtained by curing a polyester resin composition comprising a brominated polyester resin with a hydroxyl value of about 35 or less and a hydroxyl:acid molar ratio of about 2:1 to about 1:4, and vinyl monomer.

50. The casting, coating, or laminate panel of claim 49 wherein the bromine in the polyester resin accounts for about 1% to about 50% by weight of the resin composition.

51. The casting, coating, or laminate panel of claim 49 wherein the bromine in the polyester resin accounts for about 10% to about 30% by weight of the resin composition.

52. The casting, coating, or laminate panel of claim 49 wherein the vinyl monomer is selected from the group consisting of styrene, vinyl toluene, divinylbenzene, dicyclopentadiene alkeonates, (meth)acrylic acid, alcohol or glycol esters of (meth)acrylic acid, and dialkyl phthalate.

53. The casting, coating, or laminate panel of claim 49 wherein the resin composition further comprises one or more additives selected from the group consisting of fillers, free radical forming initiators, polymerization accelerators, plasticizers, antioxidants, UV stablizers, fire-retardant enhancers, dyes, pigments, fungicides, insecticides, antistatic agents, wetting agents, inhibitors, and viscosity modifiers.

54. A casting, coating, or laminate panel containing a crosslinked polyester resin, wherein the cross-linked resin is obtained by curing a polyester resin composition comprising a brominated polyester resin with a hydroxyl value of about 35 or less and a hydroxyl:acid molar ratio of about 2:1 to about 1:4, vinyl monomer, and a blending resin.

55. The casting, coating, or laminate panel of claim 54 wherein the bromine in the polyester resin accounts for about 10% to about 30% by weight of the resin composition.

56. The casting, coating, or laminate panel of claim 54 wherein the vinyl monomer is selected from the group consisting of styrene, vinyl toluene, divinylbenzene, dicyclopentadiene alkeonates, (meth)acrylic acid, alcohol or glycol esters of (meth)acrylic acid, and dialkyl phthalate.

57. The casting, coating, or laminate panel of claim 54 wherein the resin composition further comprises one or more additives selected from the group consisting of fillers, free radical forming initiators, polymerization accelerators, plasticizers, antioxidants, UV stablizers, fire-retardant enhancers, dyes, pigments, fungicides, insecticides, antistatic agents, wetting agents, inhibitors, and viscosity modifiers.

* * * * *